US005535700A

United States Patent [19]

Boudreau

[11] Patent Number: 5,535,700

[45] Date of Patent: Jul. 16, 1996

[54] BOVINE TEAT SANITIZER AND METHOD

[76] Inventor: Ronald A. Boudreau, 3421 Dragoo Park Dr., Modesta, Calif. 95350

[21] Appl. No.: 250,244

[22] Filed: May 26, 1994

[51] Int. Cl.$^6$ ........ A01J 7/04

[52] U.S. Cl. ........ 119/651; 119/673; 119/675

[58] Field of Search ........ 119/14.01, 158, 119/159

[56] References Cited

U.S. PATENT DOCUMENTS

| | | | |
|---|---|---|---|
| 2,532,088 | 11/1950 | Cordis | 119/158 |
| 3,648,696 | 3/1972 | Keith | 119/159 X |
| 3,828,776 | 8/1974 | Sparr, Sr. | 119/14.01 X |
| 5,379,724 | 1/1995 | Dee et al. | 119/158 |

OTHER PUBLICATIONS

"Teat Spray System" brochure about 1985–C–Dax Systems, Ltd. Palmerston, NZ. (3 pages).

"Vacuum Operated Automated Teat Spray" RJB Company advertisement in the The Dairyman, Aug. 1984.

"Blueprint For A Better Dip Cup" RJB Company advertisement in The Dairyman, Sep. 1985.

RJB Company brochure on "Trigger Spray" and Vacuum Operated Automated Teat Spray, about 1985.

RJB Company Illustrated Parts List on "Vacuum Operated Automated Teat Spray" about 1985.

Ambic Brochure on "Ambic Back Pack Teat Supply". Ambic Equipment Limited, Witney, Oxford, OX8, 6XT, England, about 1990.

RJB Company Brochure on Multispray (2 pages) RJB Company about 1988.

*Primary Examiner*—Robert P. Swiatek

*Attorney, Agent, or Firm*—Skjerven, Morrill, MacPherson, Franklin & Friel; Thomas S. MacDonald

[57] ABSTRACT

A bovine teat sanitizer includes a gun-like grip handle, trigger mechanism and control poppet valve connected to a pressurized sanitizing fluid supply. A fixed in-line teat cup sized to receive a predetermined volume of fluid from a proportioning valve sufficient for treating four teats of the bovine is connected to the handle. A toroidal overflow chamber receives displaced fluid from the cup when the cup captures and essentially seals a teat thus forcing sanitizing fluid into the teat strep canal and epidermis. The cup is lowered and displaced fluid from the overflow chamber returns to the cup cavity by gravity for use on the second and succeeding teats. A splash guard and teat guide snaps onto the cup and forms the chamber top and inner sides.

22 Claims, 6 Drawing Sheets

BOVINE TEAT SANITIZER AND METHOD

FIELD OF INVENTION

This invention is directed to a sanitizer apparatus and a method for bathing the teats of cows or other bovines with a sanitizing fluid. More particularly it is directed to a manually-held apparatus including a cup into which a bovine teat is inserted.

BACKGROUND OF THE INVENTION

Lactation in a cow begins after calfing. After a calf has been weaned the milking cycle begins. Milkings take place generally at two or three spaced time intervals each day using milking mechanisms which simulate the natural sucking of the weaned calf. The cow at milking time naturally relaxes the teat sphincter muscle which results in the opening the strep canal of the teat. Bacteria associated with the environment of the cow, including manure, can enter into the blood stream of the cow and cause, for example, the commonly-found mastitis disease. For some decades, dairy persons have sprayed or otherwise provide teat dip to the base of the udders and the teats to minimize this malady. The spray or dip normally is a topical preparation of chlorine or iodine in a water-alcohol solution which minimizes mastitis attacks. Generally the four teats of the cow have been sprayed with sanitizing fluid. The wetted teat then is allowed to "sit" for a short period of time usually about 30–90 seconds, excess fluid is wiped off by a single service paper towel and the milking machine attached to the cow. After milking, a second spray is utilized since it has been found that the cow needs bacterial protection for about an hour after milking.

In the prior art, cups of sanitizing fluid have been raised so a teat depends into the cup, including a cup attached to a plastic squeeze bottle containing a supply of sanitizing fluid. Thereafter, spray bottles including a simple pressure pump and trigger, such as also used for spraying insecticides or window cleaning solutions, have been employed. More sophisticated systems have came into vogue recently involving vacuum-operated automated spray devices which included a hand-operated valve connected by hoses to a central fluid supply and a spray nozzle for spraying the teats pre- and post-milking. A recent development of Ambic Equipment Limited of England includes a back-pack fluid supply tank and a piston-type squeeze gun having a tube extension with a nozzle head. The spray device can spray various amounts of fluid and can be manually moved to spray the udder and its depending teats. Excess spray merely drops to the dairy room floor. There has been a continual need to better bathe the bovine teats to prevent or minimize mastitis attacks.

SUMMARY OF THE INVENTION

The teat sanitizer of the invention provides an ergonomically designed apparatus for teat dipping employing a natural grip handle and trigger mechanism connected to a sanitizing fluid supply. An in-line teat cup extends from a tubular extension extending from the handle nozzle and the cup is sized to receive a bovine teat. The teat cup includes a bottom cavity for receiving a predetermined volume of sanitizing fluid and an upper toroidal overflow chamber. The overflow chamber is designed to receive sanitizing fluid displaced from the cavity upon insertion of a bovine teat into the cavity. A flexible sanitizing fluid hose is attached to the top of the grip handle so that the apparatus hangs in a "ready" position for use by a dairy milker. A fluid control valve is provided within the handle for releasing a predetermined volume of sanitizing fluid to the cup cavity, thus eliminating wastage of sanitizing fluid. One predetermined volume of fluid is sufficient for dipping all four of a bovine's teats. Once one teat has been treated by being bathed in the sanitizing fluid and the teat is removed, displaced fluid from the cavity which has been stored or reservoired in the overflow chamber, flows by gravity back to the cup cavity for use with the next teat of the bovine. The returning volume from the overflow chamber is less than the original volume supplied to the cup cavity, the difference representing the fluid which actually coats the teat and which is forced into the teat epidermis and strep canal. The forcing action is provided for by the proper sizing and contour of the cup cavity so that the mid-periphery of the teat temporarily is sealed to the cavity sides and the pressure exerted by the milker in lifting the cup upward against the teat bottom and side walls forces the fluid into the strep canal and the epidermis of the teat distal end. Thus a very extensive and efficient bathing of the teat is provided.

Upon completion of the bathing of a first teat, the cup is removed by short downward movement, the cup is refilled (to a lesser level than the original level) by the gravity flow of displaced fluid from the overflow chamber and the cup moved and raised to encompass a second teat again displacing excess fluid into the overflow chamber. The same sequence occurs with respect to the third teat. By the time the last of the four teats have been bathed there is essentially little sanitizing fluid left in the cup cavity. Any left-over fluid may be dumped. The trigger is again pulled to release another one of the predetermined volumes of sanitizing fluid into the cup cavity. The high sanitizing power of the new fresh volume of sanitizing fluid is effective to kill any bacteria remaining in the cup cavity so that upon subsequent use, the next bovine will not be exposed to bacteria from the previous bovine.

The cup has a vertical central axis angled back at an angle of from 92° to about 98° from a longitudinal axis of the handle so as to facilitate access to the udder and teats. The cup overflow chamber preferably is in the form of a toroid bounded by an integral upper flared outer cylindrical wall above the cup cavity. An inner and top wall of the overflow chamber is provided by a snap-on plastic cylindrical inverted annular splash guard and teat guide which is snapped down over the outer cylindrical wall. The splash guard prevents splashing of sanitizing fluid being conveyed into the cup cavity and fluid being displaced from the cup cavity when the cup is inserted under and up onto the individual teat. The inner periphery of the splash guard acts further to guide the teat into the cup cavity as the cup cavity is lifted up and around the depending teat. The splash guard can be easily snapped-off for cleaning the interior of the overflow chamber and the interior of the splash guard.

DETAILED DESCRIPTION

Figure 1:
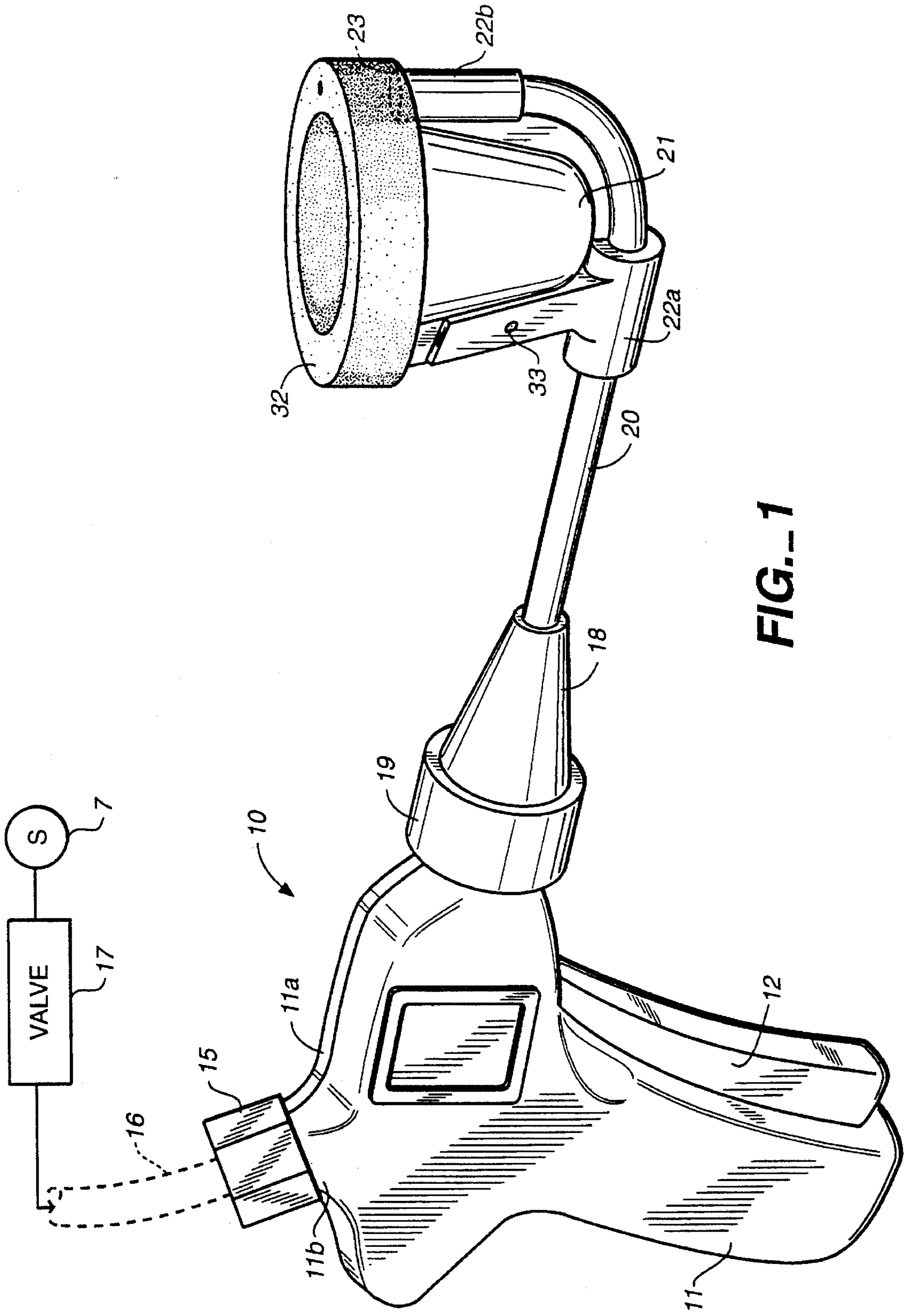
FIG. 1 is a perspective view of the sanitizer.
Figure 5:
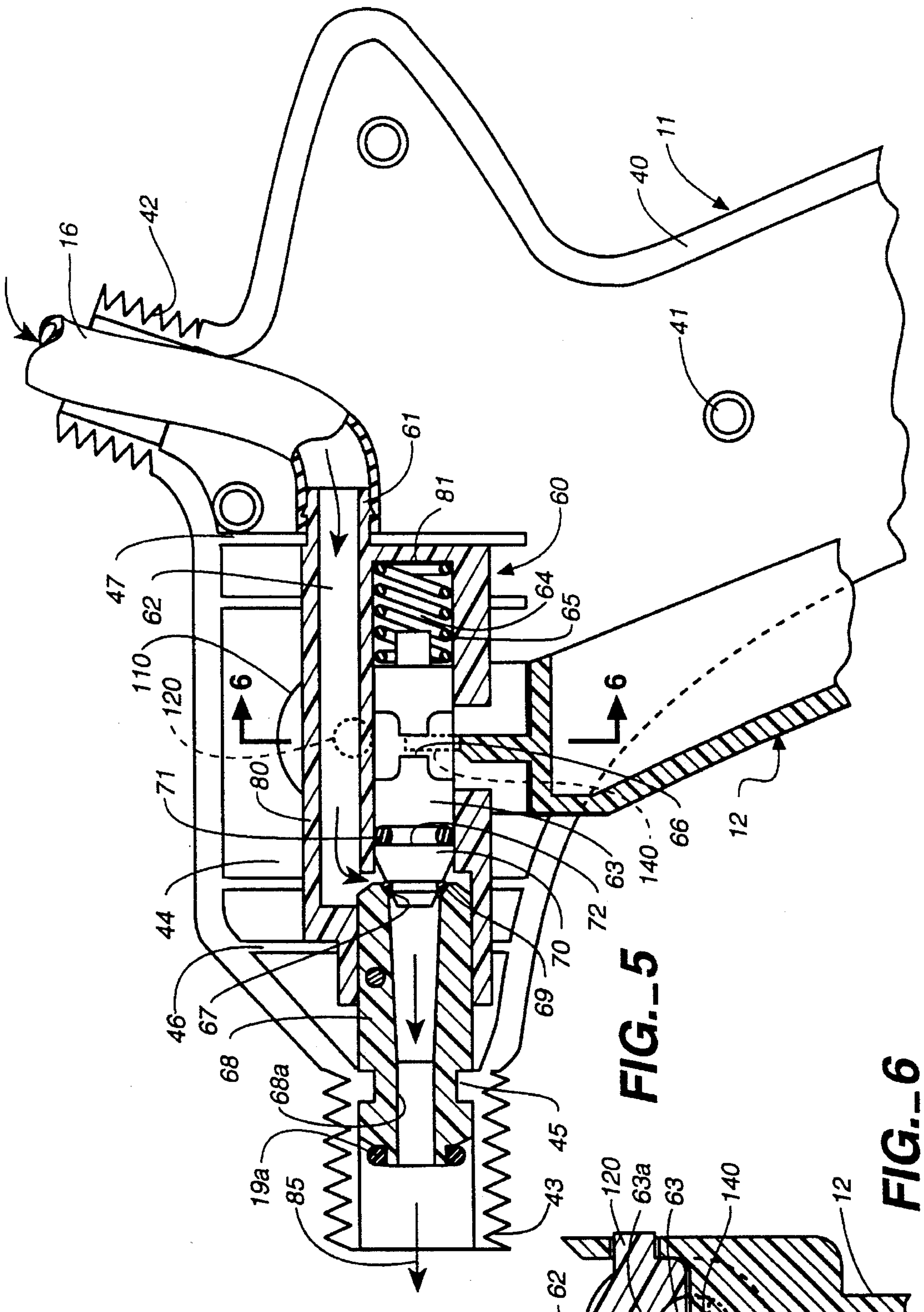
FIG. 5 is a side interior view of one-half of the handle casing showing the poppet valve and trigger mechanism.

The sanitizer 10 of the invention as seen in FIG. 1 includes a manually graspable pistol-like handle 11 and a pivotable trigger 12. A threaded stub 11b extends angularly, rearwardly and upwardly from a top **11*a* of the handle. A threaded strain relief connector 15 is affixed to stub 11*b*. A sanitizing fluid tube 16 extends from a fluid source supply S(7) pressurized by an electric pump. A proportioning valve 17 is settable to supply a fixed volume of sanitizing fluid to the sanitizer 10. Typically the pre-selected volume is from about 3 milliliters to about 15 milliliters. The volume is determined by the setting of a ball spacer seat (FIG. 7) at an appropriate level in the valve. A poppet valve 60 shown in FIG. 5 is operable by trigger 12 and permits the flow of sanitizer fluid from valve 17 through a flexible hose 16 into the handle 11 and out a rigid tube 20, preferably of stainless steel, extending from the poppet valve outlet. The tube 20 extends through a nozzle-like end 18 of the handle screwed into handle 11 by annular screw connector 19. Flow is provided into an overflow chamber 23 and teat cup 21. The flexible hose 16 is preferably constructed of polyvinylchloride (PVC) plastic. Portions 22*a* and 22*b* are separate and integral molded plastic extensions, respectively, extending from the cup which support tube 20. Fixed pin 33 prevents rotation of the cup. The cup is angled back at about from 92° to about 98° from the longitudinal axis of the tube as the tube passes through portion 22*a* to allow for faster and more efficient placement of the cup under a teat. The cup and the integral portions 22*a* and 22*b*** preferably are made of polypropylene plastic.

Figure 2:
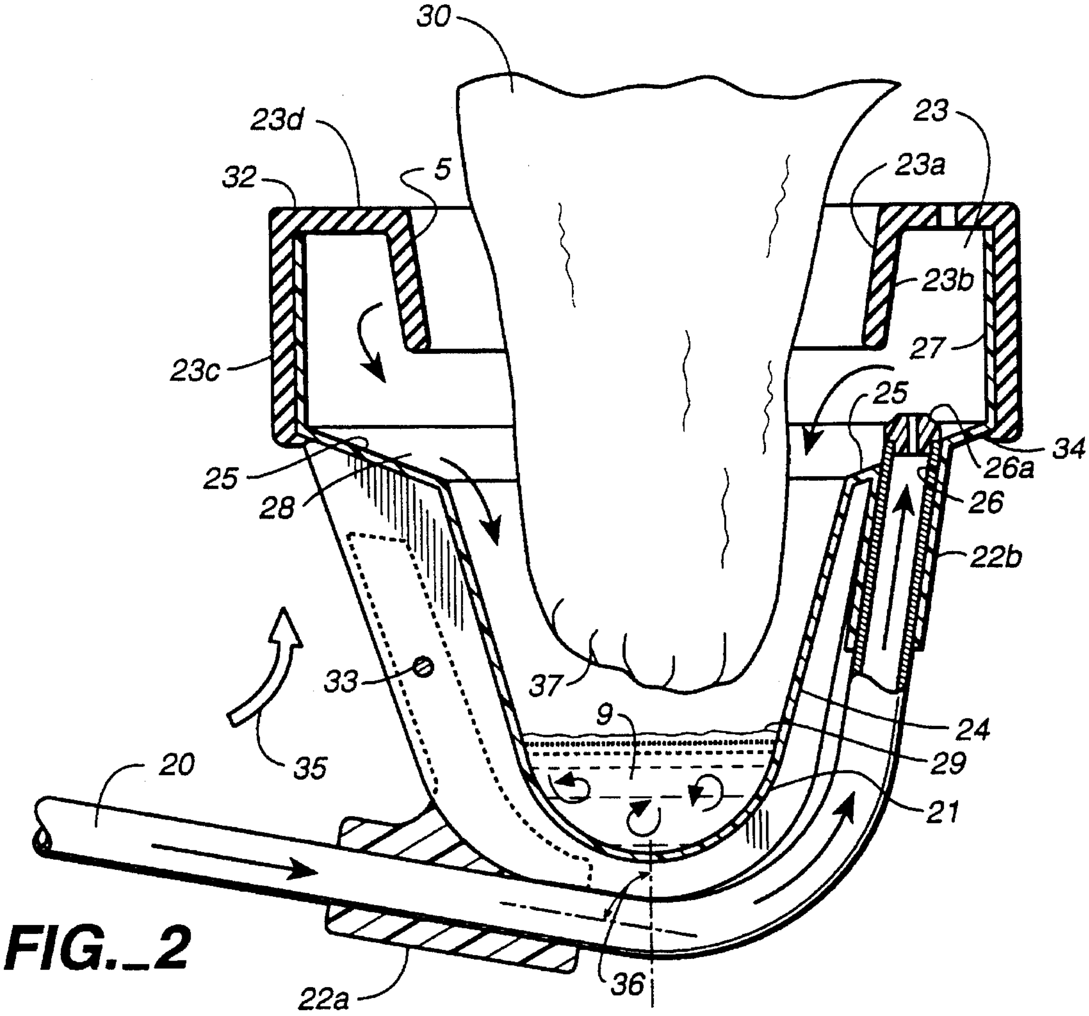
FIG. 2 is a cross-sectional view of the teat cup of the sanitizer showing the flow of sanitizing fluid into the cup to a predetermined level and initial orientation of the sanitizer with a teat.

As seen in FIGS. 1 and 2 the overflow chamber is formed by a clipped-on plastic cover made of Kayton® plastic forming an inverted annular combined splash guard and teat guide 32 having an outer tapered conical wall **23*a* which aids in guiding the teat 30 into cup cavity 24, an inner wall 23*b* which prevents splashing and for directing sanitizing fluid being conveyed through tube 20 into the cup 21, an integral top 23d and a cylindrical outer rim 23*c*. An open annulus 28 is formed between the distal bottom end of wall 23*a*, 23*b* and a flared upper surface 25 extending from the fluid-holding cavity 24 of the cup 21. The cavity is preferably in the shape of an open prolate ellipsoid. Tube 20 is sealed in a through-bore 26 in cup extension 22*b*. An integral upper cylindrical rim 27 extends upwardly from the flared upper surface 25 over which the inverted annular splash guard and teat guide 32 is snapped. A cylindrical snap ridge 34 with or without a snap groove may extend between the splash and teat guide 32 and the cup rim 27** or a friction fit may be provided.

In use the handle trigger 12 is pulled releasing a predetermined volume of sanitizing fluid through nozzle end 18. The fluid flows through tube 20 under pressure from the electric pump for example through a flow restricter **26*a* into the overflow chamber 23 and then into cup cavity 24 all as shown by the arrows in FIG. 2. Typically the cup initially will contain about 5 millimeters of sanitizing fluid 9 up to a level 29 in the fluid-holding cavity 24 of the cup prior to lifting and moving the sanitizer and its cup up to encompass the depending bovine teat 30. An orifice 5 for entry of the teat is formed by the inside diameter of guide top 23*d*. The sanitizer can be operated with the user standing either in a cow barn parlor or on a barn floor level. When the initial volume of fresh sanitizer fluid is introduced to the cup cavity 24 through the annulus 28, the fluid completely flushes the sides of the cup. Any residual bacteria from a prior bovine or the environment are instantly killed due to the high concentration of the fresh sanitizing fluid and low concentration of live bacteria remaining after the bacteria kill from the action of the prior volume of sanitizing fluid. When level 29 has been reached, the handle trigger is released leaving a preferred 3–6 ml. of sanitizing fluid 9 in the cup and fluid in tube 20**.

Figure 3:
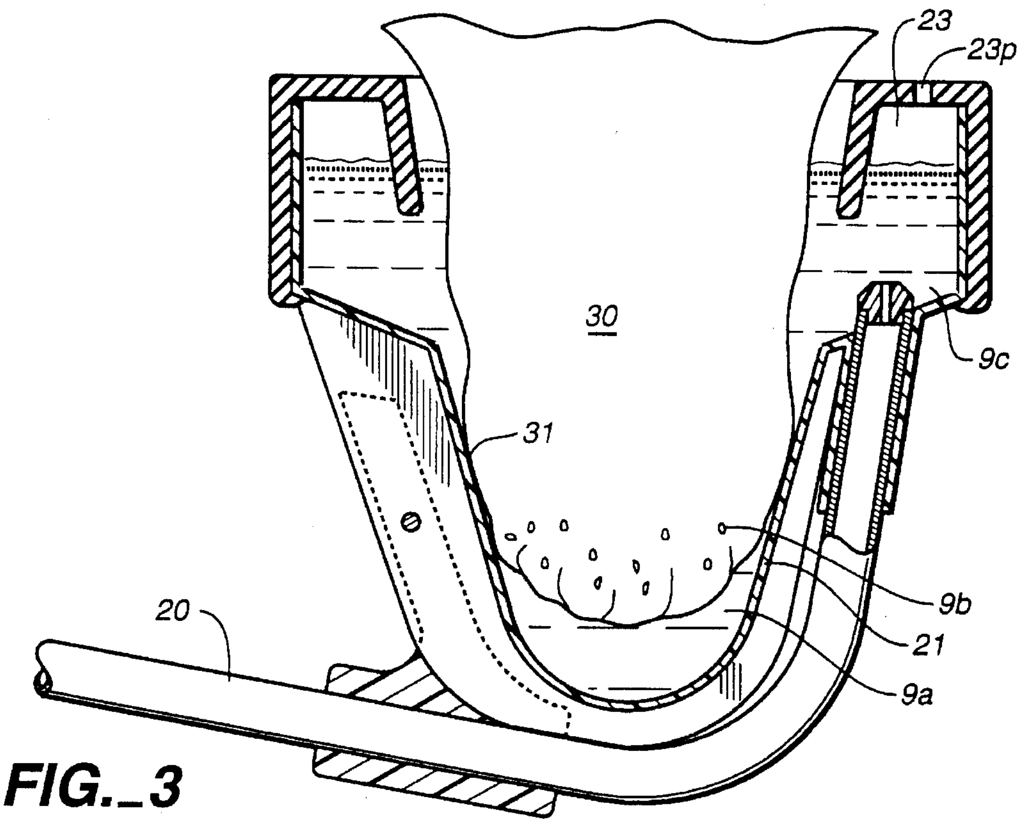
FIG. 3 is a cross-sectional view of the teat cup with the teat in sealed position in the cup cavity with excess sanitizing fluid displaced into the overflow chamber.
Figure 4:
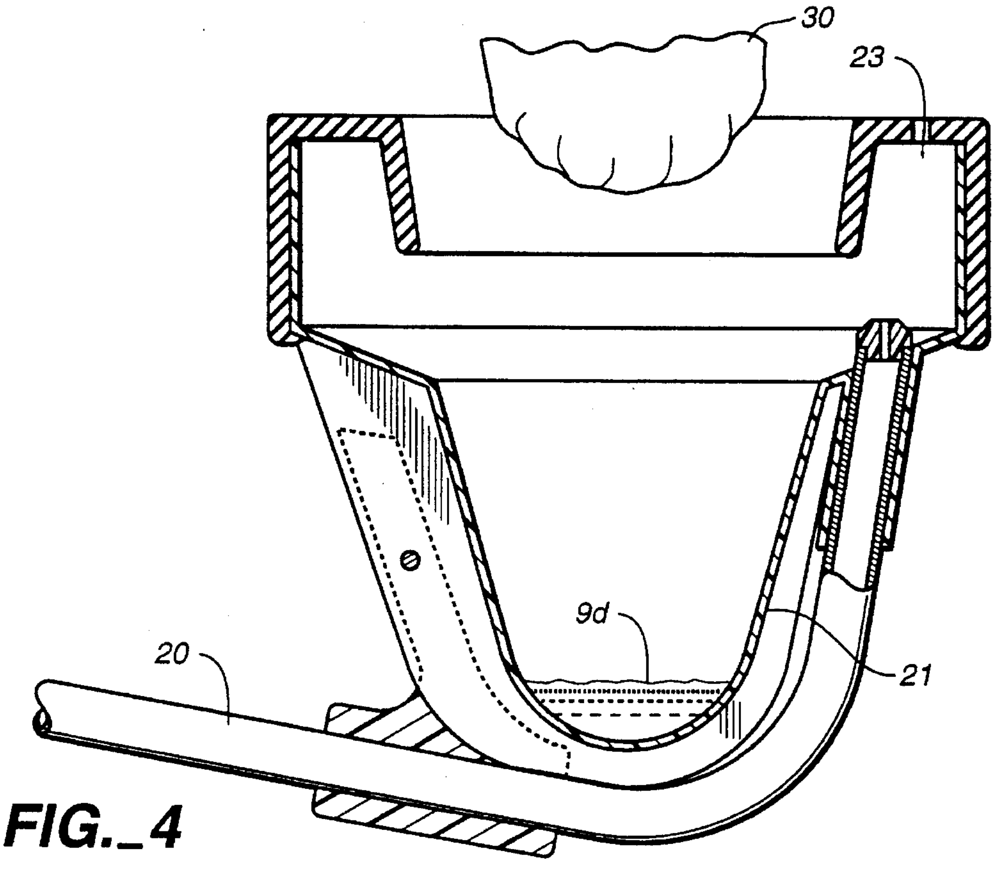
FIG. 4 is cross-sectional view of the sanitizer after the last of the four bovine teats have been bathed and coated with sanitizing fluid.

When the cup is moved essentially fully upwardly on the teat 30 as shown in FIG. 3, at least the bottom 2.5 cm of the teat is immersed in the sanitizing fluid and displaces a major portion **9*c* of the fluid into the overflow chamber while bathing the teat in the sanitizing fluid. An air bleed 23*p* is provided on guide top 23*d*. Tube 20 at this time remains with fluid filled from the last dispensing action and the restricter essentially prevents back-flow from the overflow chamber. The cylindrical edges 31 of the fleshy teat at about the 2 cm to about 4 cm level from the teat distal end seal the teat along the conical side walls of cavity 24 so that on continued upward movement of the cup, by raising the sanitizer 10 generally vertically, force remaining fluid 9*a* at the cavity bottom into the strep canal and epidermis 37 of the teat at the teat distal end. This action tends to both kill bacteria at these locations and to actually flush the strep canal and epidermal tissue and folds. The flushing action also effectively cleans the teat of any attached mud or manure. Normally the sanitizing fluid fully wets the teat as indicated at 9*b* and after the dropping and removal of the cup, stays on the teat for about two to five minutes before milking. Any excess of fluid remaining on the teat at that time can be removed by a clean one-time paper wipe. The above operation is repeated for the three remaining teats such that after the treatment of the fourth teat 30 only a minuscule amount 9*d* remains in the cup as seen in FIG. 4. Following milking each teat is again treated by use of the apparatus 10 having an initial volume of 3–6 ml. of sanitizing fluid in the cup cavity 24**, affording high mastitis protection for about an hour after milking. By that time the sphincter has closed and the likelihood of infection is minimized.

FIG. 5 shows an interior view of one-half of the molded plastic casing of handle 11. The other half of the casing 40 is a mirror image of the half shown i.e. the casing is made of two longitudinal halves with an abutment line bisecting stub 11b and a longitudinal medial line at the handle bottom. The connector 15 functions not only to provide a strain relief for hose 16 but also acts to hold the handle halves together along with bolts and nuts or screw (not shown) passing through screw bosses 41 in the handle halves. The coupling union or connector 19 preferably has a thread length equal to the number of threads 43 on the handle nozzle end 18 so that the connector 19 is hand-turned to cinch up the connector. A flared end of tube 20 contacts and seals the O-ring **19*a*. This properly orients the cup 21 upwardly in a direction forwardly generally parallel to the angled connector 15. The poppet valve 60 extends into cavity 44 while cylindrical webs of the valve 60 fit into and are supported by holding webs 45, 46 and 47, thus not placing any stresses on the valve operational mechanisms nor on the plastic threaded areas. Threads 42 are provided on the stub 11*b***.

Figure 6:
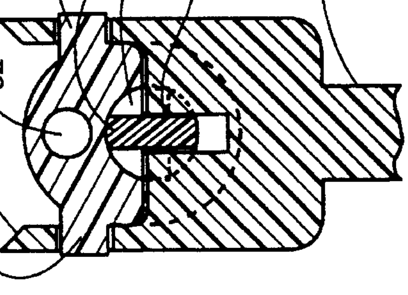
FIG. 6 is a cross-sectional view of the trigger mechanism taken on the line 6—6 of FIG. 5.
Figure 8:
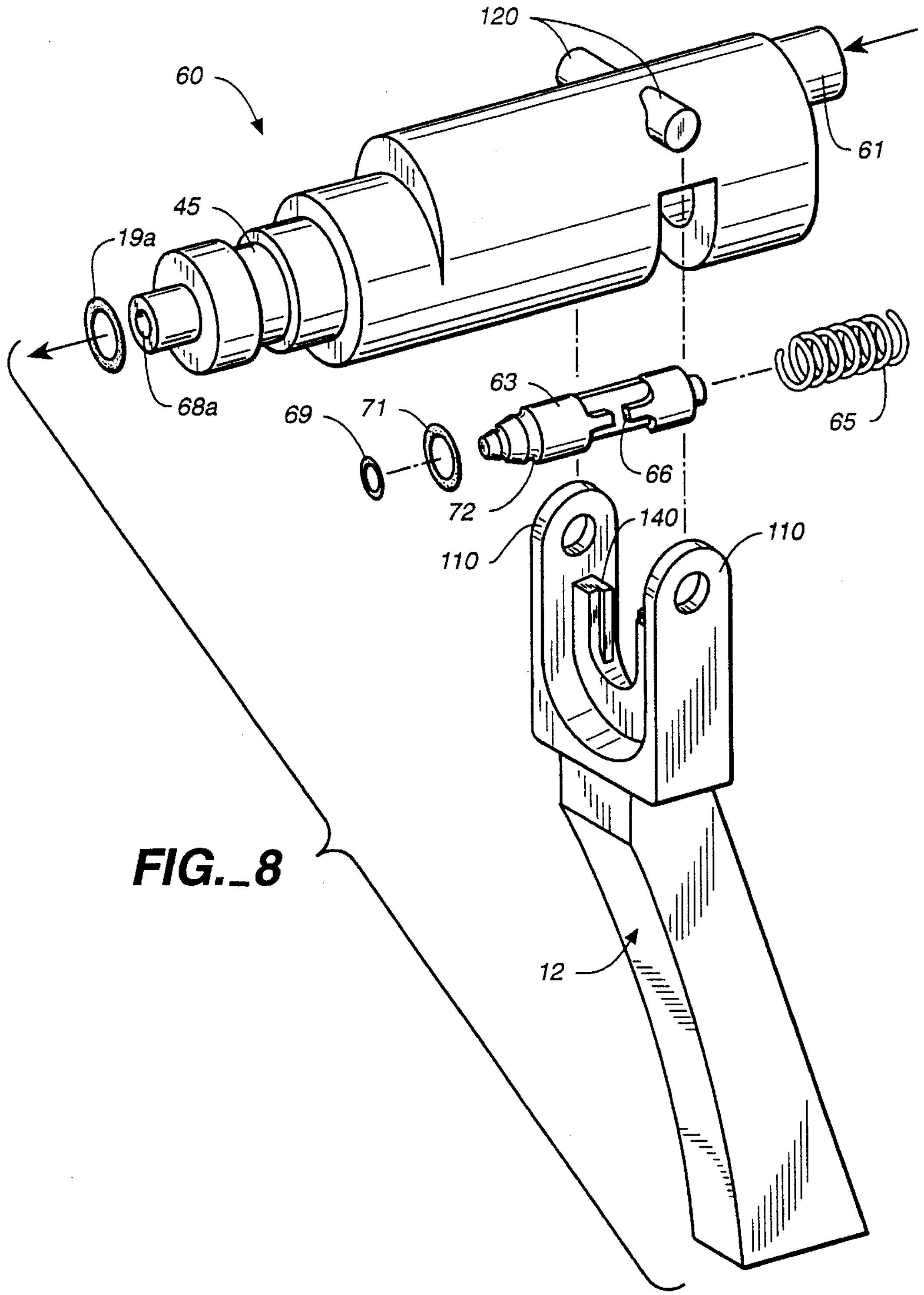
FIG. 8 is an exploded view of the triggering mechanism.

FIG. 5 also illustrates schematically the poppet valve 60 including a housing 80 which includes a barbed entry port 61 for receiving an ID of the distal end of the hose 16 extending into handle 11 (FIG. 1); a fluid entry chamber 62 and a movable poppet 63 in a parallel chamber 64. The poppet includes an activating spring 65 abutting a closed end bore cap 81, a peripheral groove 66 for receiving a trigger sear 140, which poppet is operable to open or close an orifice 67 in a stub 68, fixed in web 45 within nozzle end 18. An O-ring 69 is provided on a conical end 70 of the poppet 66 and an O-ring 71 provided on the cylindrical surface 72. Pulling of the ON-OFF intermittent flow trigger 12 (FIG. 1) pulls the poppet 66 back to compress spring 65 which opens up orifice 67 which allows the indicated-by-arrows flow of sanitizing fluid from the valve 17 through bore 68*a* (arrow 85) to the tube 20 and cup 21. Release of the trigger pivoted about pins 120 allows the spring to expand pushing the conical end 70 of poppet 66 against a tapered seat on the inner end of stub 68 and against O-ring 69 stopping the flow of fluid from the sanitizer gun. FIG. 6 shows the interaction and position of trigger sear 140 in the groove 66 formed in poppet 63. FIG. 8 illustrates how the sear 140 extending inwardly from both inner sides of the two leg yoke 110 interfit with grooves 66 of the poppet 63. Legs 110 are expanded so as to push onto pivot pins 120 such that pivot movement of trigger 12 compresses spring 65 to open the poppet valve.

Figure 7:
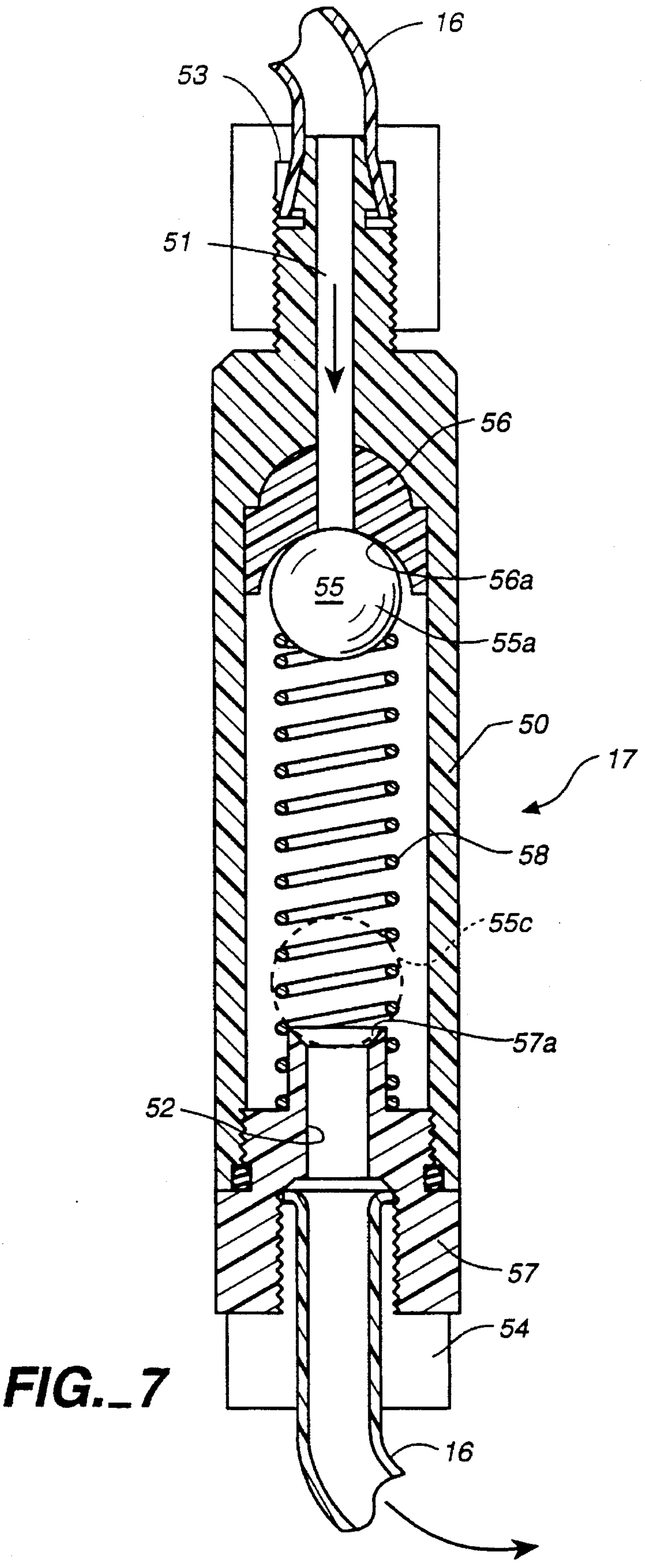
FIG. 7 is a side view of the proportioning valve partially in cross-section.

FIG. 7 shows the proportioning valve 17 which may be employed as part of the sanitizing system. A valve housing 50 includes an entry port 51 which permits flow from supply source S (FIG. 1). A supply tube is clamped into a threaded valve boss 53. A movable valve seat and a removable spacer(s) 56 of various thicknesses is provided inside the entry port. A sealing ball 55 is positioned within housing 50 and is movable to position 55*a* by action of a biasing spring 58, to be sealed against seat 56*a* of the spacer 56. About a 1 mm clearance between the ball and interior wall of the housing 50 gives a 3 mil to 15 mil volume of sanitizing fluid, dependent on the vertical level portion of the seat 56*a* of spacer 56 which is dependent on the thickness of the selected spacer 56. The lower the spacer seat 56*a* is in the housing (or the thicker the spacer is) the less of a volume of sanitizing fluid is available for flowing into the teat cup upon triggering of the sanitizer. Thus the spaced thickness is determinative of the predetermined volume of fluid to be supplied by the triggering of the poppet valve by trigger 12. A second ball seat is provided on an end closure 57 at the bottom of the housing 50, the closure having an exit port 52. A threaded boss 54 attaches flexible hose 16. The seat of closure 57 has a radial bleed passage 57*a* which functions to allow fluid to flow past the seat to break vacuum so the ball will reseat back on seat 56*a*. The fluid supply 7 is pressurized so as, upon opening of the poppet valve 60, to allow the ball 55 to be forced down off seat 56*a* to position 55*c* against the seat of closure 57, while compressing spring 58. Thus is a metered proportional supply of fluid is fed through the poppet valve 60 and to cup cavity 24.

The above description of the preferred embodiment of this invention is intended to be illustrative and not limiting. Other embodiments of this invention will be obvious to those skilled in the art in view of the above disclosure.

I claim:

1. A bovine teat sanitizer comprising:

a manually graspable handle, said handle being connectable to a sanitizing fluid supply;

an in-line teat cup extending from said handle, said cup being sized to receive a bovine teat, said cup including a closed bottom, a top inlet portion and an upper overflow chamber; and a sanitizing fluid flow line extending from said handle to the top inlet portion of said cup for conveying a predetermined quantity of sanitizing fluid from the fluid supply into said cup; and wherein said handle and said cup are adapted to be manipulated to generally encompass a depending bovine teat in said cup.

2. The sanitizer of claim 1 wherein said handle is pistol-shaped and said fluid flow line is a nonflexible tube connected to a distal end of said handle and wherein said cup is connected to said tube.

3. The sanitizer of claim 2 in which said cup has a vertical central axis angled back at an angle of from about 92° to about 98° from a longitudinal axis of said handle passing through said distal end.

4. The sanitizer of claim 1 in which said cup includes a bottom cavity in the general shape of a bottom half of an open prolate ellipsoid.

5. The sanitizer of claim 4 wherein said cup overflow chamber is toroidal and internally bounded by an inverted annular splash guard and teat guide for directing sanitizing fluid flow from said cup inlet portion into said overflow chamber and to said cavity and for guiding a depending bovine teat into said cavity, said overflow chamber receiving used sanitizing fluid displaced from said cavity by insertion of a bovine teat into said cavity.

6. The sanitizer of claim 5 wherein a top side of said splash guard includes an air bleed.

7. The sanitizer of claim 1 wherein said cup includes a bottom cavity and in which said cavity is sized to receive a measured quantity of sanitizing fluid and wherein an inserted teat displaces sanitizing fluid in said cup into said chamber, the teat is coated with sanitizing fluid and the teat is temporarily sealed in the cavity to force sanitizing fluid into a strep canal and an epidermis of the teat.

8. A bovine teat sanitizer comprising:

a manually graspable handle, said handle being connected to a sanitizing fluid supply;

an in-line teat cup extending from said handle, said cup being sized to receive a bovine teat, said cup including an upper overflow chamber;

a sanitizing fluid flow line extending from said handle to an inlet portion of said cup for conveying a predetermined quantity of sanitizing fluid from the fluid supply into said cup;

wherein said handle and said cup are adapted to be manipulated to generally encompass a depending bovine teat in said cup; and wherein said handle is connected to the fluid supply by a flexible hose extending from a fluid supply tank to said handle.

9. A bovine teat sanitizer comprising:

a manually graspable handle, said handle being connectable to a sanitizing fluid supply;

an in-line teat cup extending from said handle, said cup being sized to receive a bovine teat, said cup including an upper overflow chamber;

a sanitizing fluid flow line extending from said handle to an inlet portion of said cup for conveying a predetermined quantity of sanitizing fluid from the fluid supply into said cup;

wherein said handle and said cup are adapted to be manipulated to generally encompass a depending bovine teat in said cup; and wherein said handle is pistol-shaped and includes a sanitizing fluid entry port adjacent a top surface thereof connectable by a flexible hose to said fluid supply.

10. A bovine teat sanitizer comprising:

a manually graspable handle, said handle being connectable to a sanitizing fluid supply;

an in-line teat cup extending from said handle, said cup being sized to receive a bovine teat, said cup including an upper overflow chamber;

a sanitizing fluid flow line extending from said handle to an inlet portion of said cup for conveying a predetermined quantity of sanitizing fluid from the fluid supply into said cup;

wherein said handle and said cup are adapted to be manipulated to generally encompass a depending bovine teat in said cup;

wherein said handle includes a fluid control valve for providing intermittent flow of the predetermined quantity of sanitizing fluid to said cup; and wherein said handle includes a grip trigger for manually operating said fluid control valve.

11. The sanitizer of claim 10 wherein said control valve is a poppet valve.

12. A bovine teat sanitizer comprising:

a manually graspable handle, said handle being connectable to a sanitizing fluid supply;

an in-line teat cup extending from said handle, said cup being sized to receive a bovine teat, said cup including an upper overflow chamber;

a sanitizing fluid flow line extending from said handle to an inlet portion of said cup for conveying a predetermined quantity of sanitizing fluid from the fluid supply into said cup;

wherein said handle and said cup are adapted to be manipulated to generally encompass a depending bovine teat in said cup; and further including a proportioning valve between said fluid supply and said handle, said proportioning valve comprising a valve housing, first and second spaced valve seats in said housing, a sealing ball movable between said valve seats, and a biasing spring normally sealing said ball against one of said valve seats, and wherein movement of said ball to the other of said valve seats provides the movement of the predetermined quantity of sanitizing fluid from the fluid supply.

13. The sanitizer of claim 12 in which said one of said valve seats is provided on a removable spacer, the thickness of the spacer being determinative of the predetermined quantity of sanitizing fluid from the fluid supply.

14. A method of sanitizing a bovine teat comprising:

a) providing a sanitizing fluid supply;

b) providing a teat cup attached to a manually graspable handle, the teat cup having a closed bottom, a top inlet portion and an upper overflow chamber;

c) conveying a predetermined quantity of the sanitizing fluid from said supply through said handle to the cup top inlet portion and into the cup closed bottom;

d) moving said handle and attached cup to a position under the bovine teat with the cup containing a quantity of the sanitizing fluid therein;

e) lifting the handle and cup such that the bovine teat is inserted into and is surrounded by the cup;

f) displacing an amount of the sanitizing fluid in the cup into said overflow chamber upon insertion of the bovine teat into the cup;

g) reservoiring the displaced sanitizing fluid;

h) bathing the bovine teat with the sanitary fluid in the cup; and i) downwardly moving the handle and cup to remove the cup from the bathed bovine teat whereupon reservoired sanitizing fluid flows by gravity back to the closed bottom of the cup.

15. The method of claim 14 further including:

controlling the flow of the sanitizing fluid through the handle to the cup; and triggering an ON-OFF intermittent flow of the sanitizing fluid through the handle.

16. The method of claim 15 further including:

guiding the flow of the sanitizing fluid into said cup; and guiding the bovine teat into the cup.

17. The method of claim 14 in which said conveying step includes the step of controlling the amount of flow of the sensitizing fluid to the cup to fill the cup to a predetermined level; and shutting down the flow of the sanitizing fluid when said predetermined level has been reached.

18. The method of claim 14 further comprising repeating steps c) through i) on another bovine teat of the bovine for sanitizing each bovine teat of the bovine.

19. The method of claim 14 further comprising forcing the bovine teat into the cup to generally seal the teat in the cup and pressure forcing the sanitizing fluid into the strep canal and epidermis of the bovine teat.

20. The method of claim 14 wherein said bathing step includes coating the epidermis of the bovine teat and forcing sanitizing fluid into the bovine strep canal.

21. The method of claim 14 wherein in step f), a major amount of the sanitizing fluid is displaced from the cup to the overflow chamber.

22. The bovine teat sanitizer comprising a pistol type fluid supply gun;

a teat cup fixedly extending laterally from said gun and in flow connection with said gun, said cup being adapted to contain a measure of sanitizing fluid from said gun;

wherein said gun and said cup are manipulatable to have the cup generally encompass a depending bovine teat for bathing the bovine teat with the sanitizing fluid contained in said cup; and wherein said cup includes a bottom cavity for holding the sanitizing fluid, an integral side extension mounting said cup to said gun, a cylindrical wall extending from the cavity, and wherein an inverted annular splash guard and teat guide is fitted over said wall for directing the sanitizing fluid into said cavity and for guiding a depending bovine teat into said cavity.

* * * * *